United States Patent
Hofer et al.

(10) Patent No.: US 11,601,766 B2
(45) Date of Patent: Mar. 7, 2023

(54) BINAURAL HEARING SYSTEM HAVING TWO HEARING INSTRUMENTS TO BE WORN IN OR ON THE EAR OF THE USER, AND METHOD OF OPERATING SUCH A HEARING SYSTEM

(71) Applicant: Sivantos Pte. Ltd., Singapore (SG)

(72) Inventors: Wanja Hofer, Erlangen (DE); Ion Suberviola, Erlangen (DE); Tobias Wurzbacher, Fuerth (DE)

(73) Assignee: Sivantos Pte. Ltd., Singapore (SG)

( * ) Notice: Subject to any disclaimer, the term of this patent is extended or adjusted under 35 U.S.C. 154(b) by 0 days.

(21) Appl. No.: 17/190,680

(22) Filed: Mar. 3, 2021

(65) Prior Publication Data
US 2021/0281959 A1   Sep. 9, 2021

(30) Foreign Application Priority Data

Mar. 3, 2020   (DE) .......................... 102020202725.0

(51) Int. Cl.
*H04R 25/00* (2006.01)
*G06F 8/61* (2018.01)
*G06F 9/48* (2006.01)

(52) U.S. Cl.
CPC ............. *H04R 25/552* (2013.01); *G06F 8/61* (2013.01); *G06F 9/4843* (2013.01); *H04R 25/505* (2013.01); *H04R 25/554* (2013.01)

(58) Field of Classification Search
None
See application file for complete search history.

(56) References Cited

U.S. PATENT DOCUMENTS

| | | | |
|---|---|---|---|
| 6,549,633 B1 | 4/2003 | Westermann | |
| 8,630,434 B2 | 1/2014 | Rasmussen et al. | |
| 2013/0114818 A1* | 5/2013 | Aubreville | H04R 25/552 381/23.1 |
| 2014/0307901 A1* | 10/2014 | Ku | H04R 25/55 381/315 |
| 2015/0201284 A1* | 7/2015 | Park | H04R 25/552 381/323 |
| 2016/0080877 A1* | 3/2016 | Holm | H04R 25/552 381/23.1 |
| 2016/0157026 A1 | 6/2016 | Guindi et al. | |

FOREIGN PATENT DOCUMENTS

| | | |
|---|---|---|
| CN | 101483800 A | 7/2009 |
| CN | 101924977 A | 12/2010 |
| CN | 105409245 A | 3/2016 |
| DE | 102007010601 A1 | 9/2008 |
| EP | 2182742 A1 | 5/2010 |

* cited by examiner

*Primary Examiner* — Kenny H Truong
(74) *Attorney, Agent, or Firm* — Laurence A. Greenberg; Werner H. Stemer; Ralph E. Locher

(57) ABSTRACT

A binaural hearing system for assisting a hearing of a user includes two hearing instruments each to be worn in or on an ear of the user. An audio signal is modified in each of the two hearing instruments by way of a programmable signal processor of the respective hearing instrument by executing a plurality of software modules of firmware of the hearing system and is output by an output transducer of the respective hearing instrument. The executed software modules of the firmware are distributed asymmetrically on the two hearing instruments, so that at least one of the software modules of the firmware is selectively executed in one of the two hearing instruments.

10 Claims, 3 Drawing Sheets

BINAURAL HEARING SYSTEM HAVING TWO HEARING INSTRUMENTS TO BE WORN IN OR ON THE EAR OF THE USER, AND METHOD OF OPERATING SUCH A HEARING SYSTEM

CROSS-REFERENCE TO RELATED APPLICATION

This application claims the priority, under 35 U.S.C. § 119, of German patent application DE 10 2020 202 725.0, filed Mar. 3, 2021; the prior application is herewith incorporated by reference in its entirety.

BACKGROUND OF THE INVENTION

Field of the Invention

The invention relates to a method for operating a binaural hearing system for assisting the sense of hearing of a user, having two hearing instruments worn in or on the ear of the user. The invention furthermore relates to such a binaural hearing system.

The term hearing instrument generally refers to an electronic device which assists the sense of hearing of a person (who is referred to hereinafter as a "wearer" or a "user") wearing the hearing instrument. In particular, the invention relates to hearing instruments which are configured to entirely or partially compensate for a hearing loss of a hearing-impaired user. Such a hearing instrument is also referred to as a "hearing aid." In addition, there are hearing instruments which protect or improve the sense of hearing of users having normal hearing, for example to enable improved speech comprehension in complex hearing situations.

Hearing instruments in general, and especially hearing aids, are usually de-signed to be worn in or on the ear of the user, in particular as behind-the-ear devices (also referred to as BTE devices) or in-the-ear devices (also referred to as ITE devices). With respect to their internal structure, hearing instruments generally include at least one (acousto-electrical) input transducer, a signal processing unit (signal processor), and an output transducer. In operation of the hearing instrument, the input transducer receives airborne sound from the surroundings of the hearing instrument and converts this airborne sound into an input audio signal (i.e., an electrical signal which transports information about the ambient sound). This input audio signal is also referred to hereinafter as the "received sound signal". The input audio signal is processed (i.e., modified with respect to its sound information) in the signal processing unit in order to assist the sense of hearing of the user, in particular to compensate for a hearing loss of the user. The signal processing unit outputs a correspondingly processed audio signal (also referred to as the "output audio signal" or "modified sound signal") to the output transducer. In most cases, the output transducer is designed as an electro-acoustic transducer, which converts the (electrical) output audio signal back into airborne sound, wherein this airborne sound—modified in relation to the ambient sound—is emitted into the auditory canal of the user. In the case of a hearing instrument worn behind the ear, the output transducer, which is also referred to as a "receiver," is usually integrated outside the ear into a housing of the hearing instrument. The sound output by the output transducer is conducted in this case by means of a sound tube into the auditory canal of the user. Alternatively, the output transducer can also be arranged in the auditory canal, and thus outside the housing worn behind the ear. Such hearing instruments are also referred to as RIC ("receiver in canal") devices. Hearing instruments worn in the ear, which are dimensioned sufficiently small that they do not protrude to the outside beyond the auditory canal, are also referred to as CIC ("completely in canal") devices.

In further constructions, the output transducer can also be designed as an electromechanical transducer which converts the output audio signal into structure-borne sound (vibrations), wherein this structure-borne sound is emitted, for example into the skull bone of the user. Furthermore, there are implantable hearing instruments, in particular cochlear implants, and hearing instruments, the output transducers of which directly stimulate the auditory nerve of the user.

The term "binaural hearing system" refers to a group of two hearing instruments which cooperate to supply the two ears of the user. In addition to these two hearing instruments, such a binaural hearing system can optionally comprise one or more further electronic devices, for example a remote control, a charging device, or a programming device for the hearing instruments. In modern hearing systems, a control program, in particular in the form of a so-called app, is often provided instead of a remote control or a dedicated programming device, wherein this control program is designed for implementation on an external computer, in particular a smartphone or tablet. The external computer itself is thus regularly not part of the hearing system and in particular is generally also not provided by the producer of the hearing system.

The modification of the input audio signal is regularly carried out in modern hearing instruments by means of digital signal processing algorithms. In this case, signal processors are usually used which include at least one programmable subunit, in which the signal processing is carried out by software (i.e., by executing a computer program). The software (also referred to as "firmware") installed in the hearing instruments is regularly divided into a plurality of software modules, i.e., into multiple functional units which each fulfill a specific function. Depending on the type of programming, these software modules can be provided in various forms, for example as subprograms (also: procedures, subroutines, or functions), objects or classes in the meaning of object-oriented programming, components in the context of a component model and/or as plug-ins, etc.

The progressive development of hearing systems results in the need to integrate a growing number of sometimes numerically complex and/or storage-space-intensive software modules into the hearing instruments of a hearing system. This collides with the circumstance that the resources claimed by the software modules, namely the available processing power, the available (temporary and persistent) storage space, and the available electrical energy, are only available to a greatly restricted extent in hearing instruments—which are expediently always small, battery-operated devices.

BRIEF SUMMARY OF THE INVENTION

It is accordingly an object of the invention to provide a hearing system and method which overcome the above-mentioned disadvantages of the heretofore-known devices and methods of this general type and which provide for a binaural hearing system that is particularly resource saving.

With the above and other objects in view there is provided, in accordance with the invention, a method of operating a binaural hearing system, the hearing system having two hearing instruments to be worn in or on a respective ear of the user, the method comprising:

modifying an audio signal in each of the two hearing instruments by way of a programmable signal processor of the respective hearing instrument with an execution of a plurality of software modules of firmware of the hearing system and outputting a modified signal by way of an output transducer of the respective hearing instrument;

asymmetrically distributing the execution of the software modules of the firmware on the two hearing instruments, to thereby selectively execute at least one of the software modules of the firmware in one of the two hearing instruments;

dynamically selecting upon a start or during an operation of the hearing system one of the two hearing instruments on which at least one of the software modules of the firmware is to be executed; and selectively executing the at least one software module on the selected hearing instrument.

In other words, the objects of the invention are achieved by a method for operating a binaural hearing system for assisting the sense of hearing of a user. The hearing system comprises two hearing instruments each worn in or on an ear of the user. In each of the two hearing instruments, an audio signal is modified by means of a programmable signal processor of the respective hearing instrument with execution of a plurality of software modules of firmware of the hearing system and out-put by means of an output transducer of the respective hearing instrument. The executed software modules of the firmware are distributed asymmetrically on the two hearing instruments, so that at least one of the software modules of the firmware is selectively executed in one of the two hearing instruments. For at least one of the software modules of the firmware, it is dynamically selected upon the start or in operation of the hearing system on which of the two hearing instruments this software module is to be executed. The at least one mentioned soft-ware module is then executed selectively on the selected hearing instrument.

The above-mentioned object is also achieved according to the invention by a bin-aural hearing system for assisting the sense of hearing of a user, wherein the binaural hearing system comprises two hearing instruments each worn in or on an ear of the user. Each of the two hearing instruments respectively includes a programmable signal processor to modify an audio signal, an output transducer connected to the signal processor to output the modified audio signal, and a data transmission unit for exchanging data with the respective other hearing instrument. Firmware is installed in the hearing system. This firmware comprises a plurality of software modules which are executable in the signal processors of the two hearing instruments. The software modules of the firmware are distributed or can be distributed asymmetrically on the two hearing instruments, so that in operation of the hearing system at least one of the software modules of the firmware is executed selectively in one of the two hearing instruments. The hearing system comprises for this purpose a distribution unit, which is configured to dynamically select for at least one of the software modules of the firmware upon the start or in operation of the hearing system on which of the two hearing instruments this software module is to be executed, and to effectuate the selective execution of this software module on the selected hearing instrument.

With respect to a binaural hearing system, the object is achieved according to the invention by the features of claim 6. Advantageous embodiments or refinements of the invention, which are partially inventive as such, are represented in the de-pendent claims and the following description.

The invention generally relates to a binaural hearing system, wherein the hearing system includes two hearing instruments each worn in or on an ear of the user (a first hearing instrument for the left ear of the user and a second hearing instrument for the right ear of the user). Each of the two hearing instruments of the hearing system respectively includes at least one signal processor, and output transducer, and a data transmission unit for exchanging data (in particular wirelessly) with the respective other hearing instrument. The two signal processors are used to modify an audio signal to assist the sense of hearing of a user. The signal processors are programmable and thus each have a program-controlled processing unit, for example in the form of a CPU, and—as an integrated or external component—at least one data memory. The signal processors preferably each have a volatile operating memory here, in particular in the form of a RAM, for temporarily storing the respective program and audio data required in operation of the hearing system and furthermore preferably also a nonvolatile memory, for example in the form of an EEPROM, for persistently storing program data. The signal processors optionally additionally also contain a nonprogrammable functional unit, for example in the form of an ASIC. Each hearing instrument of the hearing system is expediently supplied with power by a battery. In addition, each hearing system expediently includes at least one input transducer.

The input transducers of the hearing system are in particular acousto-electrical transducers, which convert air-borne sound from the surroundings into electrical input audio signals (to be processed by the signal processors). The output transducers are preferably designed as electro-acoustic transducers (receivers), which convert the audio signal modified by the associated signal processing unit into air-borne sound. Alternatively, the output transducers are designed to emit structure-borne sound or to directly stimulate the auditory nerve of the user. The output transducers are each interconnected with the signal processor of the associated hearing instrument in order to output the modified audio signal.

The two hearing instruments of the hearing system are preferably constructed equivalently, in particular mirror symmetrically, with respect to their hardware structure. The signal processors of the two hearing instruments, and optionally also the input transducers, output transducers, data transmission units, batteries, and/or other hardware components (for example possible sensors), are preferably structurally equivalent (i.e., identical with respect to structure and type, in particular exchangeable) or mirror symmetrical.

The two hearing instruments of the hearing system are provided in particular in one of the structural forms described at the outset (BTE device having internal or external output transducer, ITE device, for example CIC device, hearing implant, in particular cochlear implant, etc.). The two hearing instruments are preferably also designed equivalently and in particular mirror symmetrically with respect to the external form.

The hearing system furthermore comprises software (referred to hereinafter as "firmware"), which comprises a plurality of software modules of the above-described type. The software modules are executable here in the signal processors of the two hearing instruments in order to modify the audio signals (in particular the input audio signals generated by the input transducers) or to fulfill another function required for the operation of the respective hearing instrument.

The signal processing functions implemented in the software modules of the firmware for modifying the audio signal comprise in particular frequency-selective amplification, dynamic compression, spectral compression, direction-dependent damping (beamforming), interference noise suppression (in particular active interference noise suppression or Active Noise Cancellation, abbreviated ANC), active feedback suppression (Active Feedback Cancellation, abbreviated AFC), wind noise suppression, speech activity recognition, and/or voice recognition.

The firmware furthermore preferably comprises at least one further software module which is not used directly for processing audio signals, but provides an auxiliary or infrastructure functionality for the audio signal processing. Such auxiliary functionalities comprise, for example classifying the acoustic environment by evaluation of the audio signals in order to set the signal processing in dependence thereon or the processing of sensor signals (for example signals of an accelerometer, gyroscope, magnetometer, GPS sensor, heart rate meter, thermometer, etc.), controlling functions for interacting with the user, etc. Infrastructure functionalities comprise, for example functions of an operating system of the respective signal processor, functions for installing firmware updates, functions for recording useful data (data logging), functions for activating the data transmission unit, etc.

According to the method, in operation of the hearing system, an audio signal is modified by means of the signal processor of the respective hearing instrument, wherein the modified audio signal is output by means of the output transducer of the respective hearing instrument. The software modules of the firmware executed for this purpose in the signal processors are distributed asymmetrically on the two hearing instruments, so that at least one of the software modules of the firmware is executed selectively in one of the two hearing instruments. The term "selective execution of a software module" is to be understood to mean that the relevant software module is executed exclusively in one of the two hearing instruments, while in the other hearing instrument neither an identical software module nor another software module fulfilling the same function is executed. Preferably, work results (i.e., operation results) and/or states of this software module executed selectively on one of the two hearing instruments are transmitted to the other hearing instrument.

According to the invention, a deviation is made from the typical paradigm of the hearing system programming, according to which software modules for fulfilling the same functions are implemented in parallel (and thus doubled) in both hearing instruments of a binaural hearing system. Due to the asymmetrical distribution according to the invention of the software modules, processing operations executed redundantly on both hearing instruments are (entirely or partially) avoided, whereby both processing power and also memory and power consumption are saved. On the one hand, this permits firmware of a given functional scope to be executed with comparatively small-dimensioned resources (processing power, temporary or persistent storage space, and/or electrical energy) of the hearing instrument, which in turn enables a particularly small implementation of the hearing instruments. On the other hand, firmware having particularly large functional scope may be implemented in a hearing system having given resources.

The software modules of the firmware to be executed are dynamically distributed at least in a specific proportion on the two hearing instruments. Specifically, at least one of the software modules of the firmware can be executed on each of the two hearing instruments in this case. In the course of the dynamic distribution of this at least one software module, one of the two hearing instruments is selected upon the start or in operation of the hearing system, and this software module is then selectively executed on the selected hearing instrument. In other words, it is dynamically selected upon the start or in operation of the hearing system on which of the two hearing instruments the at least one software module to be distributed is to be executed. On the basis of this selection, the execution of the at least one software module to be distributed is effectuated selectively (i.e., only) on the selected hearing instrument. The term "dynamically" means here that the described selection is changeable over time. The same hearing instrument is thus not always selected for the execution of the at least one software module to be distributed, but rather the hearing instruments alternate in the execution of this software module. This change can either take place in running operation of the hearing system or between successive operating phases between which the hearing system was switched off.

This dynamic distribution takes place in one advantageous embodiment as a function of the respective battery charge of the two hearing instruments. In this case, for example, a remaining operating time to be expected until the battery is exhausted is determined from the respective battery charge for each hearing instrument in consideration of the power consumption (i.e., the electrical power) of the software modules executed or to be executed thereon, and in each case the hearing instrument having the higher remaining operating time is selected for the software module to be selectively executed.

Multiple software modules of the firmware are preferably distributed on the two hearing instruments for respective selective execution. These software modules are distributed in particular in such a way that the respective remaining operating times of the two hearing instruments until the respective battery charge is exhausted are compared to one another. The existing energy resources of the hearing system are thus utilized particularly well. A premature failure of a single hearing instrument because of a discharged battery is thus counteracted. In other words, a particularly long total running time of the hearing system formed from the two hearing instruments is achieved.

Additionally or alternatively thereto, the dynamic distribution takes place according to the respective required processing power and/or the respective required operating memory space of the software modules to be executed. This procedure is particularly advantageous if the firmware has a chronologically varying requirement for processing power and/or operating memory in operation of the hearing system; for example, if at least one of the software modules of the firmware is not executed uninterruptedly, but only temporarily, or if at least one of the software modules requires a varying amount of processing power and/or operating memory space. The dynamic distribution takes place in particular in such a way that the demand for processing power and/or operating memory space for the software modules to be respectively executed on the two hearing instruments is balanced with one another, that both hearing instruments are thus loaded approximately equally.

The hearing system according to the invention is generally configured to automatically carry out the above-described method according to the invention. The software modules of the firmware thus are distributed or can be distributed asymmetrically on the two hearing instruments, so that in operation of the hearing system at least one of the software modules of the firmware is selectively executed in one of the two hearing instruments. The, or each, software module selectively executed on only one hearing instrument is preferably configured to transmit work results and/or states by means of the data transmission unit of the associated hearing instrument to the other hearing instrument.

With the above and other objects in view there is provided, in accordance with the invention, a binaural hearing system, comprising:

two hearing instruments each to be worn in or on an ear of a user, each of said two hearing instruments having a programmable signal processor for modifying an audio signal, an output transducer connected with said signal processor for outputting a modified audio signal, and a data transmission unit for data exchange with the respectively other hearing instrument;

firmware having a plurality of software modules installed in the hearing system;

wherein the software modules are executable in said signal processors of said two hearing instruments;

wherein the software modules of the firmware are distributed or distributable asymmetrically on the two hearing instruments, so that in operation of the hearing system at least one of the software modules of the firmware is selectively executed in one of said two hearing instruments; and a distribution unit configured, upon a start or in operation of the hearing system, to dynamically select for at least one of the software modules of the firmware on which of said two hearing instruments the at least one software module is to be executed and to cause the selective execution of the at least one software module on the selected hearing instrument.

In other words, the above-described embodiments of the method according to the invention correspond to corresponding embodiments of the hearing system according to the invention. The above statements concerning the novel method are correspondingly transferable to the hearing system according to the invention and vice versa. In one embodiment, the hearing system in particular includes a distribution unit, which is configured to dynamically distribute at least one of the software modules of the firmware in the above-described manner, i.e., to selectively assign this software module to one of the hearing instruments for execution upon the start or in operation of the hearing system. The distribution unit can fundamentally be implemented in the scope of the invention as a (nonprogrammable) electronic circuit. However, the distribution unit is preferably formed by one of the software modules of the firmware.

Other features which are considered as characteristic for the invention are set forth in the appended claims.

Although the invention is illustrated and described herein as being embodied in a binaural hearing aid system with two hearing instruments that are worn in or on the ear of the user and a method for operating such a hearing system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

Parts and variables corresponding to one another are always provided with the same reference signs in all figures.

DETAILED DESCRIPTION OF THE INVENTION

Figure 1:
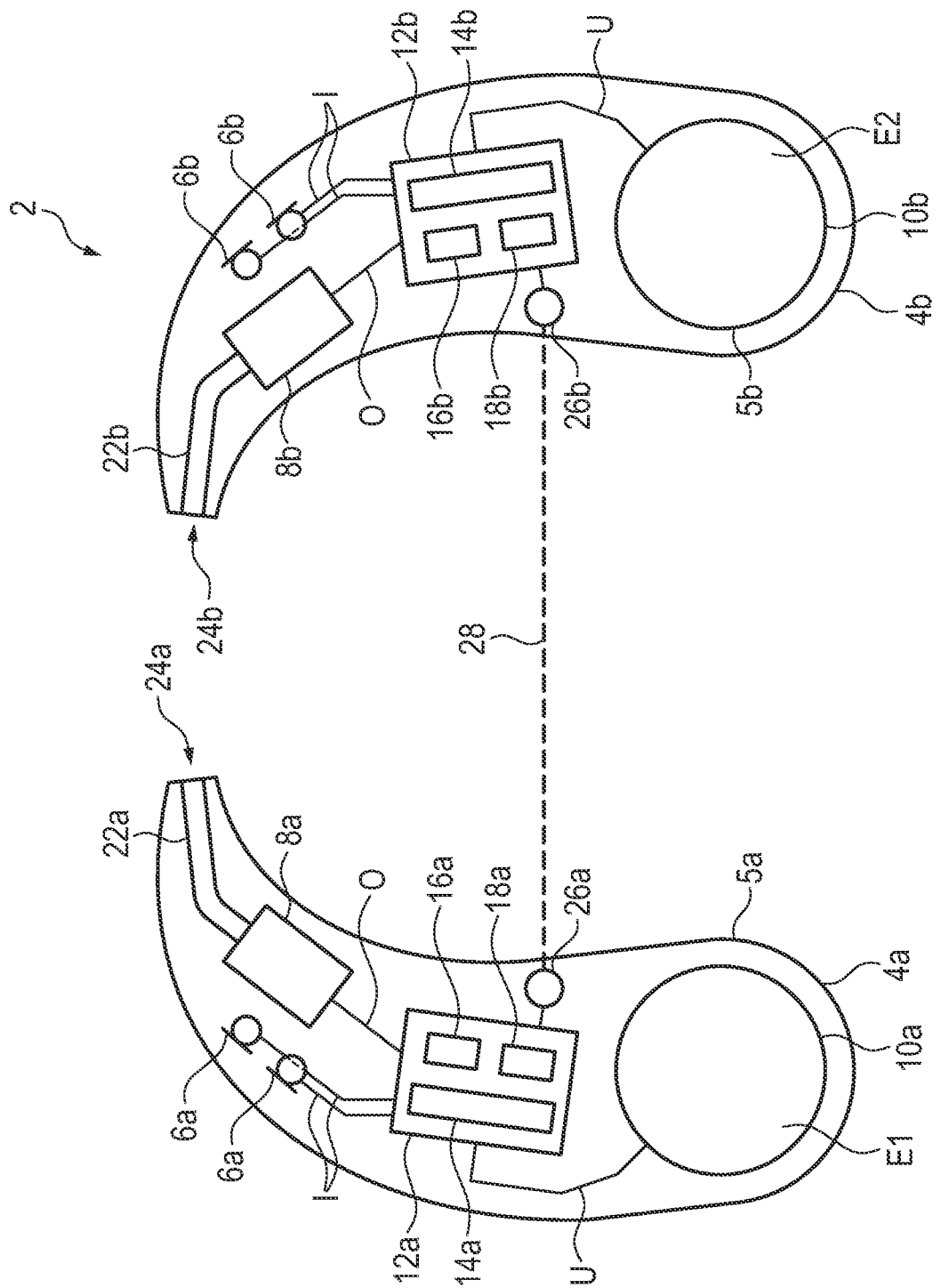
FIG. 1 shows a schematic illustration of a binaural hearing system formed from two hearing instruments; each of the two hearing instruments including a signal processor having a program-controlled processing unit, an operating memory, and a persistent memory.

Referring now to the figures of the drawing in detail and first, in particular, to FIG. 1 thereof, there is shown a binaural hearing system 2 for assisting the sense of hearing of a user. The hearing system 2 comprises two hearing instruments 4a and 4b for supplying the left or right ear of the user, respectively. Each of the hearing instruments 4a and 4b is a BTE hearing instrument, wearable behind the respective ear of the user in the example shown here. In the preferred application, the hearing instruments 4a and 4b are hearing aids which can be used to at least partially compensate for a loss of hearing of the user.

Each of the two hearing instruments 4a and 4b comprises at least one micro-phone 6a or 6b (in the illustrated example in each case two microphones 6a or 6b) forming input transducers and a receiver 8a or 8b forming output transducers inside a housing 5a or 5b, respectively. Each hearing instrument 4a, 4b furthermore comprises a battery 10a or 10b and a signal processing unit in the form of a digital signal processor 12a or 12b, respectively. Each of the two signal processors 12a, 12b includes a programmable processing unit (referred to hereinafter as CPU 14a or 14b) and has a volatile operating memory in the form of a RAM 16a or 16b and a nonvolatile (persistent) memory in the form of an EEPROM 18a or 18b, respectively. The RAM 16a, 16b and/or the EEPROM 18a, 18b are preferably integrated with the CPU 14a, 14 in one component. The CPU 14a, 14b and the respective associated RAM 16a or 16 and/or the respective associated EEPROM 18a or 18b can alternatively also be provided as separate components.

The signal processor 12a, 12b is respectively supplied from the battery 10a, 10b with an electrical supply voltage U.

In normal operation of the hearing instruments 4a, 4a, the microphones 6a, 6b each receive airborne sound from the surroundings of the respective hearing instrument 4a, 4b.

The microphones 6a, 6b convert the sound into an electrical (input) audio signal I, which contains information about the received sound. The input audio signal I is supplied inside the hearing instrument 4a, 4b to the signal processor 12a, 12b.

The signal processors 12a and 12b process the input audio signals I in the way described in greater detail hereinafter in order to compensate for the hearing loss of the user. Each signal processor 12a, 12b outputs an output audio signal O, which contains information about the processed and thus modified sound, at the receiver 8a, 8b of the respective hearing instrument 4a, 4b. The receiver 8a, 8b converts the output sound signal O into modified airborne sound. This modified airborne sound is transmitted via a sound channel 22a or 22b, which connects the receiver 8a, 8b to a tip 24a, 24b of the housing 5a, 5b, and via a flexible sound tube (not explicitly shown), which connects the tip 24a, 24b to an earpiece inserted into the associated auditory canal of the user, into this auditory canal of the user.

Each of the two hearing instruments 4a, 4b furthermore comprises a data trans-mission unit, for example in the form of a magnetic-inductive transceiver unit (referred to hereinafter as MI transceiver 26a, 26b). In operation of the hearing system 2, the signal processors 12a and 12b exchange data via the MI transceiver 26a, 26b and a wireless data transmission connection 28 established between these MI transceivers 26a, 26b and cooperate in this case in the processing of the input audio signals I.

The signal processors 12a and 12b of the two hearing instruments 4a and 4b are structurally equivalent. The hardware components of the hearing instruments 4a and 4b corresponding to one another, in particular, the input transducers 6a and 6b, the output transducers 8a and 8b, the batteries 10a and 10b, and the MI transceivers 26a and 26b, are each also embodied as structurally equivalent or mirror symmetrical to one another.

Figure 2:
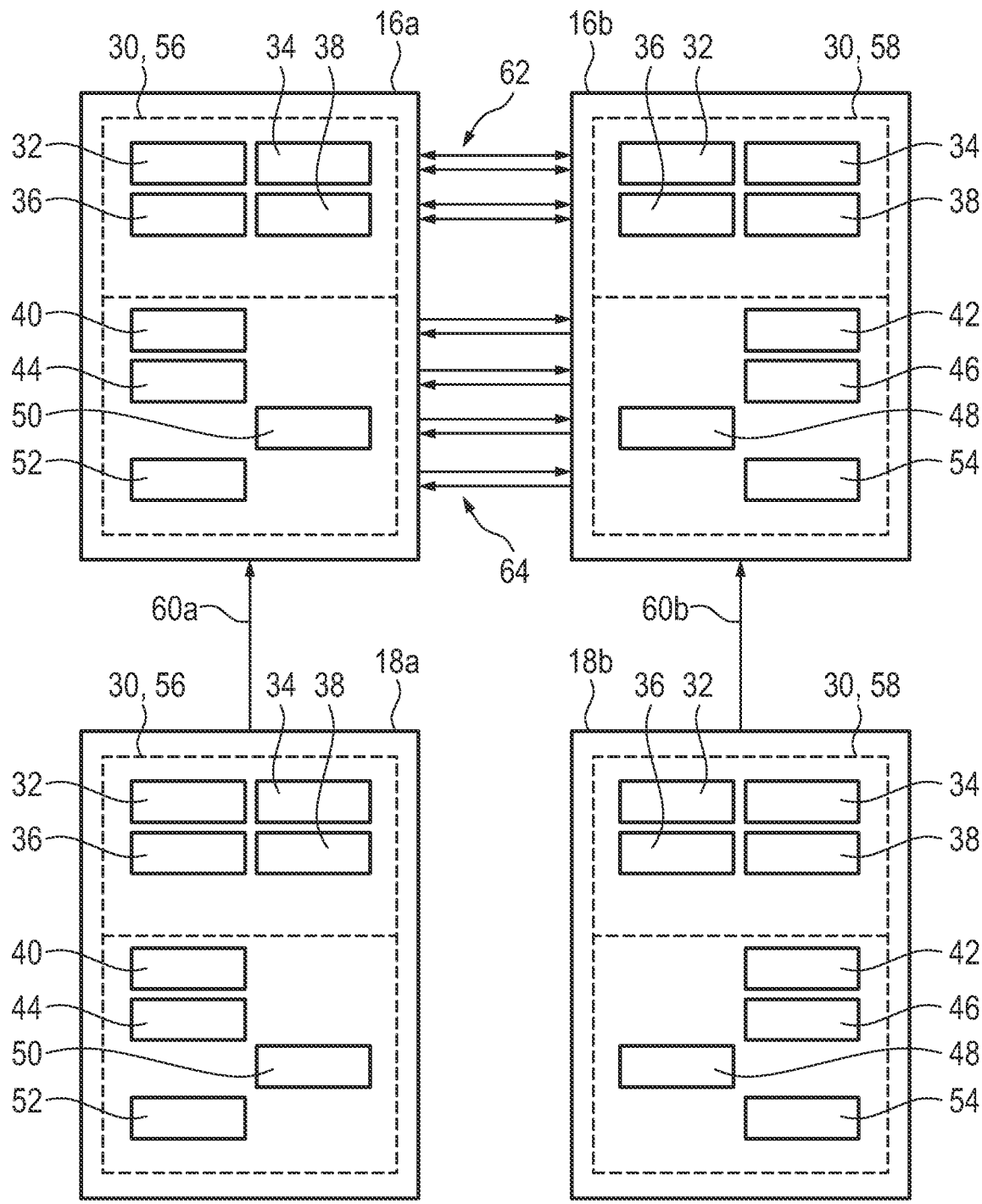
FIG. 2 shows a schematic illustration for each of the two hearing instruments of the operating memory and the persistent memory and firmware of the hearing system formed from multiple software modules, wherein a part of the software modules of the firmware is randomly distributed asymmetrically on the two hearing instruments in order to be executed selectively in each case on one of the two hearing instruments.

In the signal processors 12a and 12b, the processing of the input audio signals I is controlled by firmware 30 illustrated in simplified form in FIG. 2, which is divided into a plurality of executable software modules installed in the hearing instruments 4a and 4b. The term "firmware" refers generally here to the entirety of the software modules installed in the two hearing instruments 4a and 4b. The individual software modules each form delimited subunits of the firmware 30, for example in the form of individual objects or components. In this case, each soft-ware module implements a specific function in conjunction with the processing of the input audio signals or another function required for the correct operation of the hearing instruments 4a and 4b, in particular an auxiliary function for the audio signal processing or an infrastructure function as described above.

In more detail, the firmware 30 comprises a number of software modules (in the example according to FIG. 2, the software modules 32, 34, 36, 38), which are installed two times, namely in a first instance in the hearing instrument 4a and in a second instance in the hearing instrument 4b. These software modules 32-38 form, for example:

- an operating system for the respective signal processor 12a or 12b,
- a function for frequency-selective amplification of the respective input audio signal I as a function of audiogram data, which characterize the hearing loss of the user; the two instances of the relevant software module installed in the hearing instrument 4a or in the hearing instrument 4b, respectively, are parameterized differently, namely using the audiogram data for the respective associated ear of the user,
- a function for the dynamic compression of the respective input audio signal I; the two instances of the relevant software module (in a way respectively adapted for the hearing loss of the left ear or the hearing loss of the right ear of the user) are preferably also differently parameterized in this case,
- a function for ascertaining the charge level of the respective battery 10a or 10b,
- etc.

The firmware 30 furthermore comprises multiple software modules (in the example according to FIG. 2 the software modules 40, 42, 44, 46, 48, 50, 52, and 54), which are only installed once, namely either in the hearing instrument 4a or in the hearing instrument 4b. In the illustrated example, the software modules 40, 44, 50, and 52 are only installed in the hearing instrument 4a, while the software modules 42, 46, 48, and 54 are only installed in the hearing instrument 4b. In other words, the software modules 40, 42, 44, 46, 48, 50, 52, and 54 are asymmetrically distributed on the hearing instruments 4a and 4b. In the example according to FIG. 2, this distribution is static and is defined by the producer in the development stage of the firmware 30. The firmware 30 is thus divided into two invariable subgroups 56 and 58, of which the subgroup 56 (comprising the software modules 32, 34, 36, 38, 40, 44, 50, and 52) is associated with the left hearing instrument 4a and the subgroup 58 (comprising the software modules 32, 34, 36, 38, 42, 46, 48, and 54) is associated with the right hearing instrument 4b.

The asymmetrically distributed software modules 40-54 form, for example

- a function for recognizing a walking movement by analyzing the input audio signals I of at least one of the hearing instruments 4a, 4b and/or possibly by analyzing the signals of an internal or external movement sensor,
- a function for ascertaining a degree of activity of the user by analyzing the input audio signals I of at least one of the hearing instruments 4a, 4b and/or possibly by analyzing the signals of an internal or external movement sensor,
- a function for classifying a hearing situation by analyzing the input audio signals I of at least one of the hearing instruments 4a, 4b,
- a function for statistically registering characteristics of the acoustic surroundings of the user on a longer timescale (for example for registering the background noise) by analyzing the input audio signals I of at least one of the hearing instruments 4a, 4b,
- a function for recognizing a head turn of the user by analyzing the input audio signals I of at least one of the hearing instruments 4a, 4b and/or possibly by analyzing the signals of an internal or external movement sensor,
- a function for ascertaining the reverberation duration by analyzing the input audio signals I of at least one of the hearing instruments 4a, 4b,
- etc.

The subgroups 56 and 58 are preferably composed in such a way that the soft-ware modules respectively contained therein each in total have an approximately equal demand for electrical power, processing power, and/or operating memory in operation of the hearing system 2.

In FIG. 2, the EEPROM 18a and 18b and the RAM 16a and 16b are shown by way of example for each hearing instrument 4a and 4b. It is apparent from this illustration that only the software modules of the respective associated subgroup 56 or 58, respectively, are persistently stored in the EEPROM 18*a* and 18*b* of each hearing instrument 4*a* or 4*b*. The two subgroups 56 or 58 are moreover selected in such a way that they require an approximately equal persistent memory space on the respective associated hearing instrument 4*a* or 4*b*.

After the switching on of the hearing instrument 4*a*, the software modules 32, 34, 36, 38, 40, 44, 50, and 52 of the subgroup 56 are loaded from the EEPROM 18*a* into the RAM 16*a* (which is indicated in FIG. 2 by an arrow 60*a*) and executed in the CPU 14*a*. Similarly, after the switching on of the hearing instrument 4*b*, the software modules 32, 34, 36, 38, 42, 46, 48, and 54 of the subgroup 58 are loaded from the EEPROM 18*b* into the RAM 16*b* (which is indicated in FIG. 2 by an arrow 60*b*) and executed in the CPU 14*b*.

In operation of the hearing instruments 4*a* and 4*b* the software modules 32-38 executed in the two hearing instruments 4*a* and 4*b* exchange data—if necessary—via the MI transceivers 26*a*, 26*b* and the data transmission connection 28 with the respective other hearing instrument 4*b* or 4*a*, which is illustrated by arrows 62 in FIG. 2. The software modules 40-54 only executed selectively in one of the hearing instruments 4*a* or 4*b* also transmit data (namely the work results respectively generated by these software modules 40-54) via the MI transceivers 26*a*, 26*b* and the data transmission connection 28 to the respective other hearing instrument 4*b* or 4*a*, which is illustrated by arrows 64 in FIG. 2.

Figure 3:
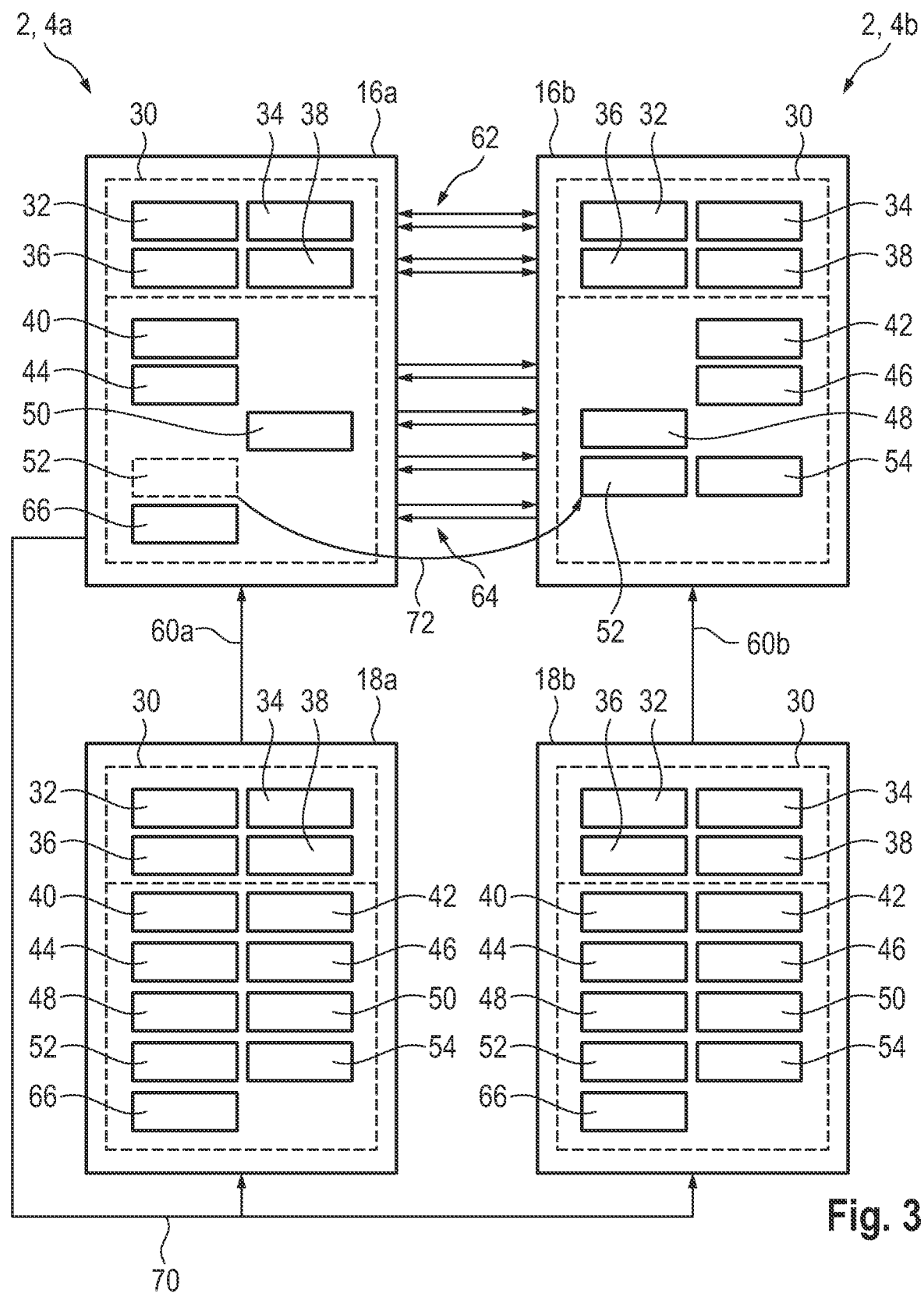
FIG. 3 shows, in an illustration according to FIG. 2, an alternative embodiment of the hearing system, wherein some of the software modules are dynamically distributed asymmetrically on the two hearing instruments by a distribution unit upon the start or in operation of the hearing system, in order to be selectively executed in each case on one of the two hearing instruments.

FIG. 3 shows an alternative embodiment of the hearing system 2, in which—contrary to the embodiment according to FIG. 2—the software modules 40-54 are dynamically distributed on the hearing instruments 4*a* and 4*b* upon the start and in operation of the hearing system 2, in order to be selectively executed on the respective assigned hearing instrument 4*a*, 4*b*. In contrast to the static distribution according to FIG. 2, in the case of the dynamic distribution according to FIG. 3, the association of the software modules 40-54 with the hearing instruments 4*a* and 4*b* is not fixedly predetermined, but rather can be changed—in particular also in running operation of the hearing system 2. This dynamic distribution is performed by a further software module of the firmware 30, which is referred to hereinafter as the distribution unit 66.

Also contrary to the embodiment according to FIG. 2, in the hearing system 2 according to FIG. 3, preferably the entire firmware 30 is stored in each case in both the EEPROM 18*a* of the hearing instrument 4*a* and also in the EEPROM 18*b* of the hearing instrument 4*b*, so that program data of software modules does not have to be transmitted between the hearing instruments 4*a* and 4*b* in order to start the respective software module. Alternatively, however, the firmware 30 can also only be stored in one EEPROM 18*a* or 18*b* or can be distributed on both EEPROMs 18*a* and 18*b*.

The distribution unit 66 is preferably—similarly to the software modules 40-54—executed selectively in one of the two hearing instruments 4*a*, 4*b*. The selection of the hearing instrument 4*a*, 4*b*, on which the distribution unit 66 is to be executed can be permanently predetermined by the producer. Alternatively thereto, the distribution unit 66 is always executed on the hearing instrument 4*a*, 4*b* of the hearing system 2 which is switched on first.

In the example according to FIG. 3, the distribution unit 66 is executed by way of example in the hearing instrument 4*a*. After the switching on of the hearing instrument 4*a*, in addition to the software modules 32-38, the distribution unit 66 is therefore also loaded in the RAM 16*a*. After the switching on, the software modules 40-54 are distributed on the hearing instruments 4*a* and 4*b* by the distribution unit 66 either according to a permanently predetermined scheme or in the way set last (before the prior switching off). For this purpose, the distribution unit 66 (as indicated by an arrow 70 in FIG. 3) causes the respective software modules, which are to be distributed on the hearing instrument 4*a* or the hearing instrument 4*b*, to be loaded into the respective associated RAM 16*a* or 16*b* from the EEPROM 18*a* and the EEPROM 18*b*.

During the operation of the hearing system 2, the distribution unit 66 ascertains the charge level of the batteries 10*a*, 10*b* of the two hearing instruments 4*a*, 4*b*, calculates therefrom—for example by extrapolation of the time change of the charge levels—for each hearing instrument 4*a* and 4*b* a remaining operating time to be expected in each case until the exhaustion of the respective battery 10*a*, 10*b*, and compares these remaining operating times.

If the distribution unit 66 establishes upon this comparison that the remaining operating times differ by more than a predetermined threshold value, the distribution unit 66 redistributes one or more of the software modules 40-54, which previously ran on the hearing instrument 4*a*, 4*b* having the shorter remaining operating time, onto the hearing instrument 4*a*, 4*b* having the longer remaining operating time. For this purpose, the distribution unit 66 causes, on the one hand, the or each software module 40-54 to be redistributed to be loaded in the hearing instrument 4*a*, 4*b* having the longer remaining operating time from the EEPROM 18*a*, 18*b* therein into the respective RAM 16*a*, 16*b* and executed and, on the other hand, stops the execution of this software module 40-54 on the hearing instrument 4*a*, 4*b* having the shorter remaining operating time. In FIG. 3, such a redistribution is indicated by way of example for the software module 52, the execution of which is stopped in this example—indicated by an arrow 72—on the hearing instrument 4*a* and is started on the hearing instrument 4*b*. If necessary, states and/or parameter values of the software module 40-54 to be redistributed (in the example thus of the software module 52) are transmitted from the previously assigned hearing instrument 4*a*, 4*b* to the hearing instrument 4*a*, 4*b* assigned in future (in the example thus from the hearing instrument 4*a* to the hearing instrument 4*b*), so that the software module 40-54 can continue the previous function seamlessly, i.e., without information loss or changes of the properties, after the redistribution.

The above-described method is repeated by the distribution unit 66 continuously or at regular or irregular time intervals. In this case, the distribution unit 66 always redistributes enough of the software modules 40-54 that the remaining running times of the two hearing instruments 4*a* and 4*b* are equalized to one another.

The distribution of the software modules 40-54 is thus progressively adapted to changing charge levels of the batteries 10*a*, 10*b*. In this way, a premature failure of one of the hearing instruments 4*a*, 4*b* due to discharged battery 10*a*, 10*b* is avoided and therefore the hearing system 2 can be used for a particularly long time without having to replace the batteries 10*a*, 10*b* or—if possible—recharge them.

In refined embodiments of the hearing system 2, the dynamic distribution of the software modules 40-54 is additionally optimized in such a way that the processing power and/or the operating memory which is respectively required by the software modules associated with each of the hearing instruments 4*a*, 4*b* is approximately equalized between the hearing instruments 4*a*, 4*b*.

It will be understood that, while the invention is particularly clear from the above-described exemplary embodiments, it is not restricted by these exemplary embodiments.

Rather, further embodiments of the invention can be derived by a person skilled in the art from the claims and the above description.

The following is a summary list of reference numerals and the corresponding structure used in the above description of the invention:
2 hearing system
4a,4b hearing instrument
5a,5b housing
6a,6b microphone
8a,8b receiver
10a,10b battery
12a,12b signal processor
14a,14b CPU
16a,16b RAM
18a,18b EEPROM
22a,22b sound channel
24a,24b tip
26a,26b MI transceiver
28 data transmission connection
30 firmware
32 software module
34 software module
36 software module
38 software module
40 software module
42 software module
44 software module
46 software module
48 software module
50 software module
52 software module
54 software module
56 subgroup
58 subgroup
60a,60b arrow
62 arrow
64 arrow
66 distribution unit
70 arrow
72 arrow
I input audio signal
O output audio signal
U supply voltage

The invention claimed is:

1. A method of operating a binaural hearing system, the hearing system having two hearing instruments to be worn in or on a respective ear of the user, the method comprising:
distributing multiple software modules of firmware for respective selective execution on the two hearing instruments of the hearing system in such a way that a demand for processing power and/or operating memory space for the software modules respectively executed on the two hearing instruments are equal to one another;
modifying an audio signal in each of the two hearing instruments by way of a programmable signal processor of the respective hearing instrument by executing a plurality of software modules of the firmware of the hearing system and outputting a modified signal by way of an output transducer of the respective hearing instrument;
asymmetrically distributing the execution of the software modules of the firmware onto the two hearing instruments, to thereby selectively execute at least one of the software modules of the firmware in one of the two hearing instruments;
dynamically selecting upon a start or during an operation of the hearing system one of the two hearing instruments on which at least one of the software modules of the firmware is to be executed; and
selectively executing the at least one software module on the selected hearing instrument.

2. The method according to claim 1, which comprises transmitting operation results and/or states of the at least one software module to the respectively other hearing instrument.

3. The method according to claim 1, wherein the step of dynamically selecting one of the two hearing instruments comprises selectively executing the at least one software module of the firmware as a function of a respective battery charge.

4. The method according to claim 1, which comprises distributing multiple software modules of the firmware for respective selective execution on the two hearing instruments of the hearing system in such a way that remaining operating times of the two hearing instruments until an exhaustion of a respective battery charge are equal to one another.

5. A binaural hearing system, comprising:
two hearing instruments each to be worn in or on an ear of a user;
each of said two hearing instruments having a programmable signal processor for modifying an audio signal, an output transducer connected with said signal processor for outputting a modified audio signal, and a transceiver for data exchange with the respectively other hearing instrument;
firmware having a plurality of software modules installed in the hearing system;
wherein the software modules are executable in said signal processors of said two hearing instruments;
wherein the software modules of the firmware are distributed or distributable asymmetrically on the two hearing instruments, so that in operation of the hearing system at least one of the software modules of the firmware is selectively executed in one of said two hearing instruments; and
a distribution unit configured, upon a start or in operation of the hearing system, to dynamically select at least one of the software modules of the firmware on which of said two hearing instruments the at least one software module is to be executed and to cause the selective execution of the at least one software module on the selected hearing instrument, and
wherein said distribution unit is configured to distribute multiple software modules of the firmware for respective selective execution on said two hearing instruments of the hearing system in such a way that a demand for processing power and/or operating memory space for the software modules respectively executed on said two hearing instruments is equal to one another.

6. The binaural hearing system according to claim 5, wherein the software modules are configured to transmit operation results and/or states by way of said transceiver to the respectively other hearing instrument.

7. The binaural hearing system according to claim 5, wherein said distribution unit is configured to dynamically select one of said two hearing instruments for the selective execution of at least one software module of the firmware as a function of a respective battery charge.

8. The binaural hearing system according to claim 5, wherein said distribution unit is configured to distribute multiple software modules of the firmware for respective selective execution on said two hearing instruments of the hearing system in such a way that remaining operating times of said two hearing instruments before an exhaustion of the respective battery charge are equal to one another.

9. The binaural hearing system according to claim 5, wherein said signal processors of said two hearing instruments are structurally equivalent or mirror symmetrical to one another.

10. The binaural hearing system according to claim 9, wherein all hardware components of said two hearing instruments are structurally equivalent or mirror symmetrical to one another.

* * * * *